(12) United States Patent
Hagen et al.

(10) Patent No.: US 9,528,465 B2
(45) Date of Patent: Dec. 27, 2016

(54) INTERNAL COMBUSTION ENGINE FOR NATURAL GAS COMPRESSOR OPERATION

(71) Applicants: Christopher Hagen, Bend, OR (US); Guy Babbitt, Fort Collins, CO (US)

(72) Inventors: Christopher Hagen, Bend, OR (US); Guy Babbitt, Fort Collins, CO (US)

(73) Assignee: Oregon State University, Corvallis, OR (US)

( * ) Notice: Subject to any disclaimer, the term of this patent is extended or adjusted under 35 U.S.C. 154(b) by 0 days.

(21) Appl. No.: 14/676,725

(22) Filed: Apr. 1, 2015

(65) Prior Publication Data

US 2015/0285182 A1  Oct. 8, 2015

Related U.S. Application Data

(60) Provisional application No. 61/974,395, filed on Apr. 2, 2014, provisional application No. 62/080,880, filed on Nov. 17, 2014.

(51) Int. Cl.
*F02F 1/42* (2006.01)
*F02B 33/22* (2006.01)
(Continued)

(52) U.S. Cl.
CPC ............... *F02F 1/42* (2013.01); *F02B 33/22* (2013.01); *F02D 17/026* (2013.01);
(Continued)

(58) Field of Classification Search
CPC .... F02F 1/42; F02F 2001/244; F02D 13/0276; F02D 13/06; F02D 17/00; F02D 17/023; F02D 17/026; F02D 19/02; F02D 19/021; F02D 19/022; F02D 39/08; F04B 41/04; F04B 35/002; F04B 25/00; F04B 25/005; F02M 21/0224; F02M 21/0218; F02M 21/0245; F02M 59/02; F02M 59/025; F02M 59/08; F02M 59/16; F02M 59/38; F02M 59/44; F02M 59/464; F02M 2700/33; F02B 33/22; F02B 33/02; F02B 33/44; Y02T 10/32; Y10T 29/4927
(Continued)

(56) References Cited

U.S. PATENT DOCUMENTS 3,958,900 A * 5/1976 Ueno ...................... F01L 13/06
                                                    123/198 F
3,963,379 A * 6/1976 Ueno ...................... B60T 1/14
                                                    123/198 F
(Continued)

FOREIGN PATENT DOCUMENTS

EP          0269882       6/1988
EP          0 938 625     10/2003
(Continued)

OTHER PUBLICATIONS

"Pioneering natural gas vehicle research," College of Engineering, Oregon State University, http://engineering.oregonstate.edu/pioneering-natural-gas-vehicle-research, 5 pp., published Oct. 17, 2012, downloaded Dec. 17, 2014.
(Continued)

*Primary Examiner* — Grant Moubry
(74) *Attorney, Agent, or Firm* — Klarquist Sparkman, LLP

(57) ABSTRACT

This application concerns systems and methods for compressing natural gas with an internal combustion engine. In a representative embodiment, a method is featured which includes placing a first cylinder of an internal combustion engine in a compressor mode, and compressing a gas within the first cylinder, using the cylinder as a reciprocating compressor. In some embodiments a compression check
(Continued)

valve system is used to regulate pressure and flow within cylinders of the engine during a compression process.

30 Claims, 13 Drawing Sheets

(51) Int. Cl.
*F02M 21/02* (2006.01)
*F02D 17/02* (2006.01)
*F02F 1/24* (2006.01)

(52) U.S. Cl.
CPC .... *F02M 21/0218* (2013.01); *F02M 21/0224* (2013.01); *F02F 2001/244* (2013.01); *Y02T 10/32* (2013.01); *Y10T 29/4927* (2015.01)

(58) Field of Classification Search
USPC .................................. 123/198 F, 198 C, 52.2
See application file for complete search history.

(56) References Cited

U.S. PATENT DOCUMENTS

| | | | |
|---|---|---|---|
| 4,825,820 A | 5/1989 | Morgan | |
| 5,163,409 A | 11/1992 | Gustafson et al. | |
| 5,947,697 A | 9/1999 | Morrison | |
| 7,448,354 B2* | 11/2008 | Price | F01L 1/047 123/188.1 |
| 7,461,619 B2* | 12/2008 | Price | F01L 1/047 123/321 |
| 8,151,747 B2 | 4/2012 | Phillips | |
| 8,356,478 B2 | 1/2013 | Fong et al. | |
| 8,443,769 B1* | 5/2013 | Lippitt | F02B 25/04 123/568.13 |
| 8,499,727 B1* | 8/2013 | Pett, Jr. | F02B 75/18 123/190.1 |
| 8,505,504 B2* | 8/2013 | Green | F01L 7/026 123/51 B |
| 8,539,763 B2* | 9/2013 | McBride | F01B 23/00 60/509 |
| 8,578,708 B2* | 11/2013 | Bollinger | H02J 15/006 60/398 |
| 8,667,792 B2* | 3/2014 | McBride | F01B 1/01 60/408 |
| 8,833,315 B2* | 9/2014 | Phillips | F02B 33/22 123/198 F |
| 2007/0079815 A1 | 4/2007 | Shinkarenko et al. | |
| 2010/0077982 A1 | 4/2010 | Chapman et al. | |
| 2010/0229806 A1 | 9/2010 | Kemeny | |
| 2013/0192701 A1 | 8/2013 | Poorman | |
| 2014/0182561 A1 | 7/2014 | Ibizugbe, Jr. | |
| 2014/0238327 A1 | 8/2014 | Hagen et al. | |

FOREIGN PATENT DOCUMENTS

| | | |
|---|---|---|
| EP | 1 882 879 A2 | 1/2008 |
| FR | 2 257 782 | 8/1975 |
| GB | 1 466 311 | 3/1977 |
| GB | 2403772 | 1/2005 |
| WO | WO 2007/122108 | 11/2007 |
| WO | WO 2009/020488 | 2/2009 |
| WO | WO 2014/134555 | 9/2014 |

OTHER PUBLICATIONS

Elgin, et al., "Combustion Chamber Design Considerations for a Compression Ignition Engine to Spark Ignited Natural Gas Engine Conversion," presented at the 2013 Fall Technical Meeting of the Western States Section of the Combustion Institute, Fort Collins, CO, Oct. 7, 2013, 6 pp.
International Search Report and Written Opinion issued by the ISA/US on Jun. 6, 2014, for related PCT patent application No. PCT/US2014/019623, filed Feb. 28, 2014, 11 pp.
International Search Report and Written Opinion issued by the ISA/European Patent Office on Jun. 8, 2015, for corresponding PCT patent application No. PCT/US2015/023932, filed Apr. 1, 2015, 11 pp.
Natural Gas Vehicle Self-Contained Home Filling Station, poster presented at 2013 ARPA-E Energy Innovation Summit, Washington, D.C., Feb. 25, 2013, 4 pp.
NGV Onboard Refueling System, presentation given at 2013 ARPA-E Move Annual Meeting, Atlanta, GA, Nov. 18, 2013, 4 pp.
NGV Self-Contained Home Filling Station, poster presented at 2012 ARPA-E MOVE Kickoff Meeting, Arlington, VA, Dec. 6, 2012, 3 pp.
Office action issued by the U.S. Patent and Trademark Office on Feb. 27, 2015, for related U.S. Appl. No. 14/244,807, 16 pp.
PDF of http://arpa-e.energy.gov/?q=arpa-e-projects/gas-compressing-engine, Natural Gas Vehicle Self-Contained Home Filling Station, Oregon State University—Cascades, 2 pp, archived Feb. 20, 2013, downloaded Dec. 17, 2014.
PDF of http://www.osucascades.edu/chris-hagen, Chris Hagen, Oregon State University—Cascades, 5 pp, archived Apr. 29, 2013, downloaded Dec. 17, 2014.
PDF of http://www.osucascades.edu/chris-hagen, Chris Hagen, Oregon State University—Cascades, 5 pp, archived Jan. 5, 2013.
PDF of http://www.osucascades.edu/powered-natural-gas, Powered by Natural Gas, Oregon State University—Cascades, 2 pp, archived Oct. 26, 2013.

\* cited by examiner

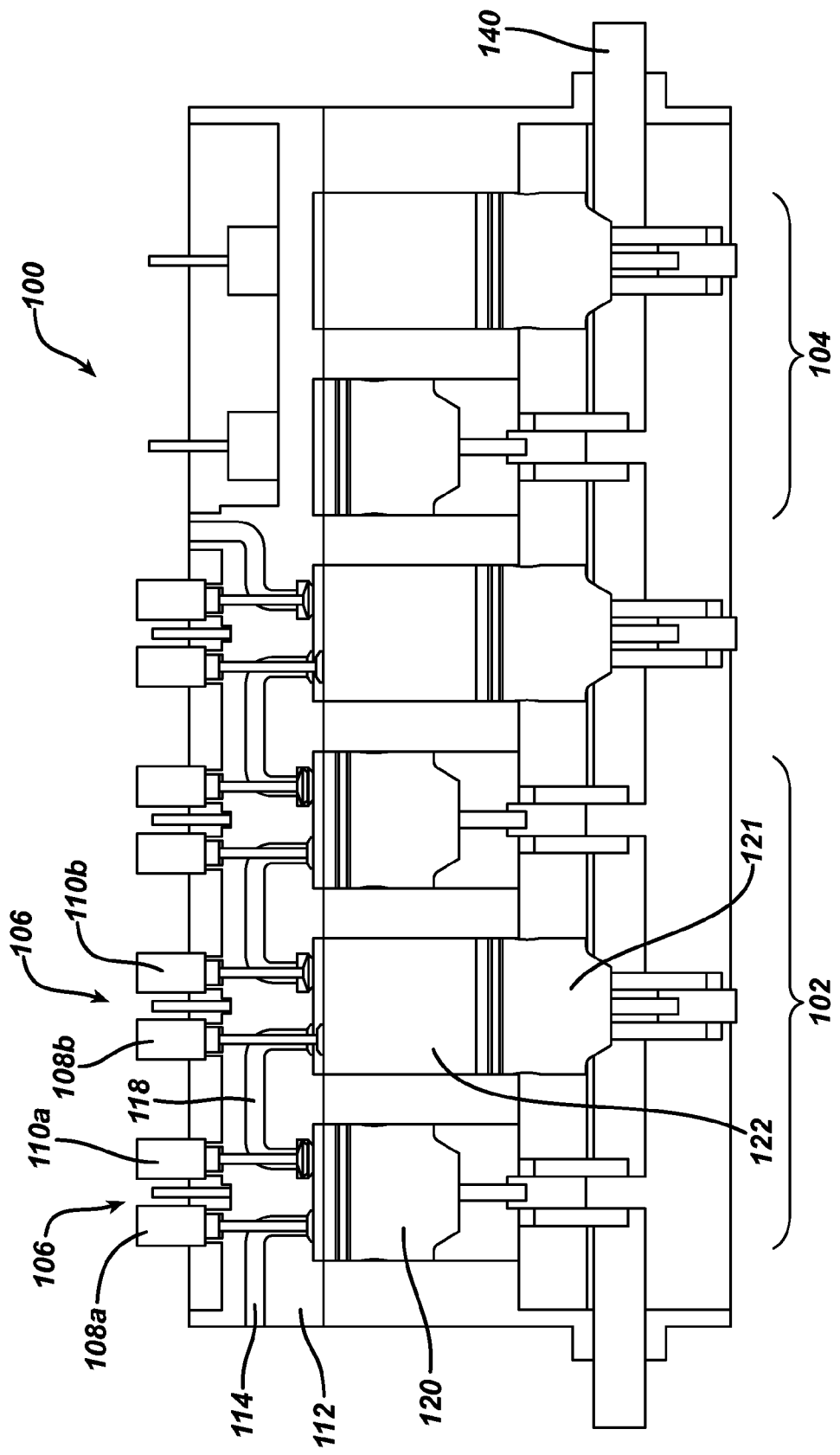

INTERNAL COMBUSTION ENGINE FOR NATURAL GAS COMPRESSOR OPERATION

CROSS-REFERENCE TO RELATED APPLICATIONS

This application claims the benefit of the earlier filing date of U.S. Provisional Application No. 61/974,395, filed on Apr. 2, 2014, and U.S. Provisional Application No. 62/080,880, filed on Nov. 17, 2014, the disclosures of which are hereby incorporated by reference herein in their entirety.

ACKNOWLEDGMENT OF GOVERNMENT SUPPORT

This invention was made with government support under DE-AR0000259 awarded by the U.S. Department of Energy. The government has certain rights in the invention.

FIELD

This application concerns systems and methods for compressing natural gas with an internal combustion engine.

BACKGROUND

Reciprocating internal combustion engines for passenger and commercial vehicles that are configured to operate on natural gas are commonly available. Internal combustion engines configured to operate using conventional motor fuels, such as gasoline or diesel, are also easily converted to run on natural gas. However, relatively few refueling stations exist that offer compressed natural gas for use in passenger and commercial vehicles. As a result, operators of natural gas-powered vehicles often must drive long distances to the nearest refueling station. This lack of natural gas refueling infrastructure has limited the adoption of natural gas-powered vehicles by the public and industry to those who operate on fixed routes and/or return to a central location where a refueling station can be located. Accordingly, improvements to natural gas-powered vehicles, systems and methods for refueling natural gas-powered vehicles, are desirable.

SUMMARY

Disclosed herein are representative systems and methods that can be used to compress natural gas using an internal combustion engine for storage onboard a vehicle. In a representative embodiment, a system for compressing a gas comprises a reciprocating internal combustion engine including at least one piston-cylinder assembly comprising a piston configured to travel in a cylinder and to compress gas in the cylinder in multiple compression stages.

It is noted that the phrases "first cylinder", "second cylinder", "third cylinder", etc. in this section and in the claims do not refer to the location of the cylinders; instead, "first", "second", "third", etc. are merely used to provide antecedent basis and for clarity.

In one aspect, the disclosure features a method that includes placing a first cylinder of an internal combustion engine in a compressor mode; and compressing a gas within the first cylinder, using the cylinder as a reciprocating compressor. In some implementations, the method further includes controlling the flow rate and timing of gas into and out of the first cylinder using a check valve system.

In another aspect, the disclosure features a method that includes placing a first cylinder of an internal combustion engine in a compressor mode; compressing a gas within the first cylinder, using the cylinder as a reciprocating compressor; routing the compressed gas through an outlet of the first cylinder to an inlet of a second cylinder; and, further compressing the compressed gas in the second cylinder. In some implementations, the compressed gas may be routed directly from the outlet of the first cylinder to the inlet of the second cylinder. In some cases, flow of the gas between the outlet of the first cylinder and the inlet of the second cylinder may be controlled, e.g., utilizing a check valve system to regulate flow in response to pressure differentials within the cylinders.

In yet another aspect, the disclosure features a method that includes placing first and second cylinders of an internal combustion engine in a compressor mode; compressing a first portion of a gas within the first cylinder, using the cylinder as a reciprocating compressor; and compressing a second portion of the gas in the second cylinder, during compression of the first portion. The method may, in some instances, further comprise placing a third cylinder in a compressor mode, routing the compressed gases from the first and second cylinders to the third cylinder, and further compressing the gases from the first and second cylinders in the third cylinder.

In a further aspect, the disclosure features a method that includes placing a first cylinder of an internal combustion engine in a compressor mode; delivering a gas to the first cylinder; compressing a gas within the first cylinder, using the cylinder as a reciprocating compressor; and boosting pressure of the gas delivered to the to the first cylinder using an onboard booster compressor.

In another aspect, the disclosure features a system for compressing a gas, which includes an internal combustion engine having a head and a plurality of bimodal cylinders in fluid communication with each other through conduits in the head, an inlet configured to allow the gas to be delivered to the head, and a check valve system configured to regulate flow into and out of the bimodal cylinders during compression of the gas within the bimodal cylinders.

In a further aspect, the disclosure features a method for compressing a gas, the method including (a) compressing the gas in two or more stages, in two or more cylinders of an internal combustion engine, and (b) routing the gas between the cylinders in a manner that additional clearance volume is minimized between stages.

In some implementations of this aspect the internal combustion engine includes a cylinder head defining one or more compressed gas conduits between the cylinders, and routing the gas comprises allowing the gas to flow through the conduit(s).

As used herein, the term "top dead center" (TDC) refers to a position of a piston in a cylinder in which the piston is farthest from the rotational axis of the crankshaft, and the term "bottom dead center" (BDC) refers to a position in which the piston is closest to the rotational axis of the crankshaft.

In internal combustion engines, the volume remaining in the cylinder chamber when the piston is at TDC is referred to as the "clearance volume." The clearance volume in the cylinder is calculated empirically by filling the chamber with a measured amount of fluid while the piston is at TDC. The phrase "additional clearance volume," as used herein, refers to clearance volume that occurs between check valves. In the systems disclosed herein, because the gas is transferred through a relatively low volume channel between cylinders the additional clearance volume is kept to a minimum.

The disclosure also features engine assemblies having check valve systems that facilitate compression of gas within the cylinders.

In one aspect, the disclosure features an engine assembly that includes (a) a cylinder block defining a plurality of cylinder chambers; (b) a cylinder head defining a compressed gas inlet and a compressed gas outlet in communication with one of the chambers; and (c) an inlet check valve mounted in the compressed gas inlet and an outlet check valve mounted in the compressed gas outlet. In some implementations, the engine assembly may include one or more conduits configured to deliver gas directly from an outlet of one of the cylinder chambers to an inlet of another of the cylinder chambers. Such conduits may be internal or external to the head.

In another aspect, an internal combustion engine comprises a first bimodal cylinder operable in a compression mode or a combustion mode and a cylinder head including a valve system to regulate a flow of gas into and out of the first bimodal cylinder when compressing gas in the first bimodal cylinder.

In another aspect, a method comprises making an internal combustion engine including a first bimodal cylinder operable in a compression mode or a combustion mode, the internal combustion engine further comprising a cylinder head including a valve system to regulate a flow of gas into and out of the first bimodal cylinder when compressing gas in the first bimodal cylinder.

In another aspect, a method comprises operating a vehicle having an internal combustion engine including a first bimodal cylinder operable in a compression mode or a combustion mode, the first bimodal cylinder being operable as a reciprocating compressor to compress gas when operating in the compression mode.

The foregoing and other objects, features, and advantages of the invention will become more apparent from the following detailed description, which proceeds with reference to the accompanying figures.

BRIEF DESCRIPTION OF THE DRAWINGS

FIGS. 3A-3E are various views of an engine assembly suitable for use in the system shown in FIG. 2. FIG. 3A is a cross-sectional view, taken along line A-A in FIG. 3C, of the engine during Stage 1 compression; FIG. 3B is a cross-sectional plan view of the engine during Stage 2 compression; FIG. 3C is a perspective cross-sectional view taken along a plane generally perpendicular to the plane of FIG. 3A; FIG. 3D is a top down perspective view; and FIG. 3E is a diagrammatic bottom view of a portion of the cylinder head.

DETAILED DESCRIPTION

Figure 1:
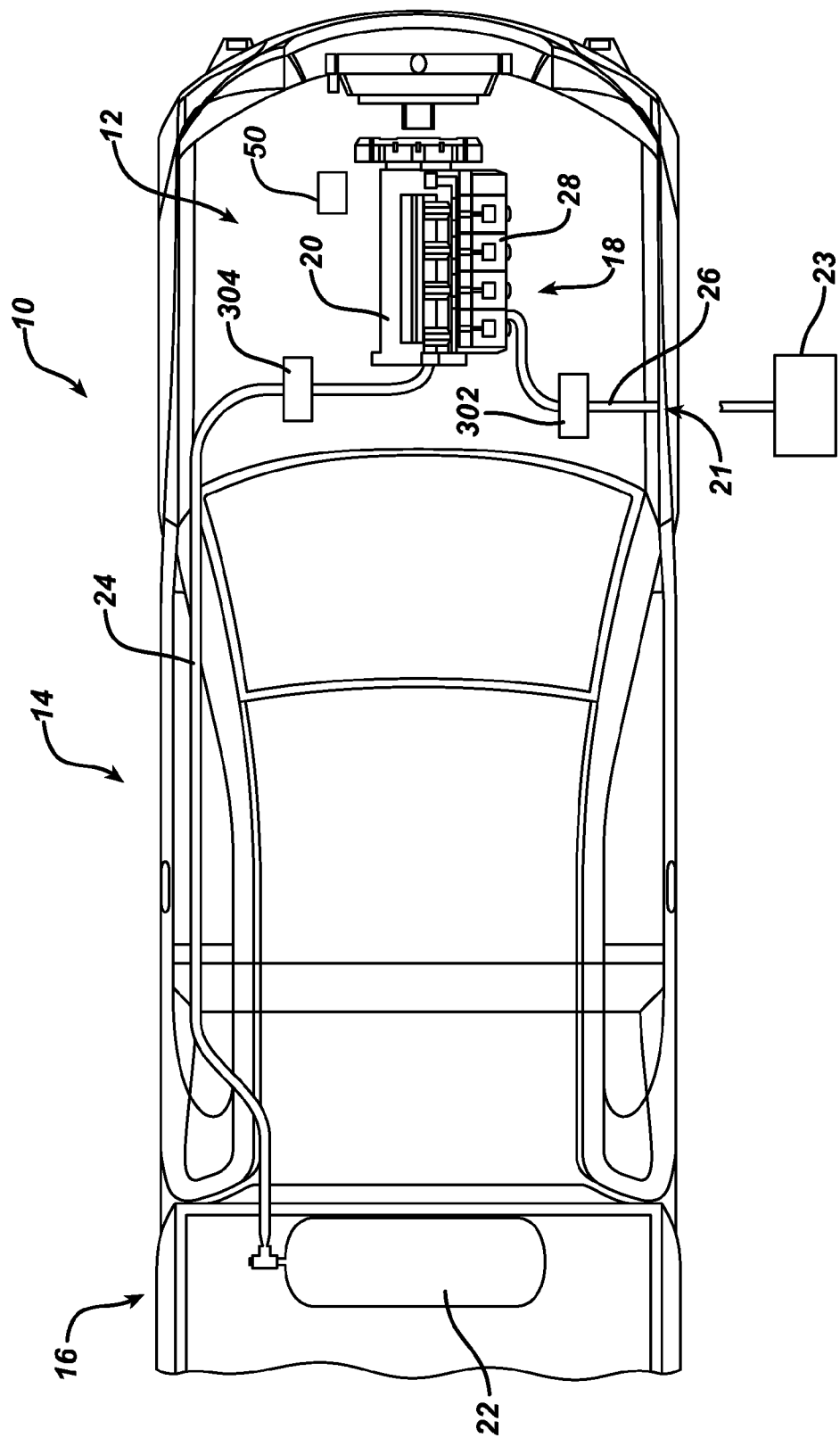
FIG. 1 is a diagrammatic plan view of a vehicle having an onboard natural gas compression system according to one embodiment of the invention.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

The present disclosure features systems and methods of compressing a gas utilizing one or more cylinders of an internal combustion engine, wherein the one or more cylinders compressing the gas are driven by the remaining cylinders of the engine. In other words, certain cylinders of the engine can be operable to compress gas (e.g., in the manner of a reciprocating compressor), while power for compression is provided by burning fuel in the remaining cylinders of the engine. Such systems and methods can be useful for compressing and storing a gas onboard a vehicle for use as fuel. Onboard compression systems and methods are disclosed in U.S. patent application Ser. No. 14/244,807, and its parent, International Patent Application No. PCT/US2014/019623, the full disclosures of which are incorporated herein by reference. These systems include a valve manifold block external to the engine, and a plurality of compression tanks in fluid communication with the valve manifold block.

Referring to internal combustion engines generally, an engine can include a cylinder block, a cylinder head, and a plurality of piston-cylinder assemblies. Each of the piston-cylinder assemblies can include a piston configured to travel in a cylinder defined by the cylinder block and the cylinder head. The pistons can be coupled to a crankshaft such that rotary motion of the crankshaft translates to linear motion of the piston in the cylinder. In this manner, the pistons can be configured to travel in the respective cylinders between a top dead center (TDC) position and a bottom dead center (BDC) position. The operation of the piston-cylinder assemblies during combustion is well known and is described in U.S. patent application Ser. No. 14/244,807, incorporated by reference above.

In the systems described below, a plurality of the piston-cylinder assemblies are configured as bimodal piston-cylinder assemblies (referred to hereinafter as "bimodal cylinders"), which can be operated in either a combustion mode or a compression mode. In the combustion mode, a bimodal cylinder can burn a fuel-air mixture drawn in through an intake valve and exhaust the combustion gases through an exhaust valve in a standard four-cycle mode. The various stages of the four-cycle combustion mode can occur in accordance with the position of the bimodal cylinder in the firing order relative to the other standard piston-cylinder assemblies. Each bimodal cylinder can also include one or more compressor check valves (described in detail below) for use when operating in the compression mode. While operating in the combustion mode, the compressor check valves can be in the closed position.

In the compressor mode, the intake and exhaust valves of each bimodal cylinder can be deactivated (e.g., by collapsible cam lifters) such that they remain in the closed position, and the compressor check valves can be activated. Natural gas from a natural gas source can then be drawn into the bimodal cylinder and compressed by the piston.

The bimodal cylinder can also include a bimodal piston, and can be configured to compress natural gas in a two-cycle mode when operating in the compressor mode (i.e., natural gas is drawn into the cylinder on a downward stroke of the bimodal piston and compressed by the bimodal piston on an upward stroke). The operation of the bimodal cylinders and their compression check valve systems will be described in detail below.

In the implementations discussed below, the cylinder head of the engine includes a controllable check valve system (for example, the compressor check valves of the bimodal cylinders) that allows a relatively high compression ratio to be obtained during gas compression (e.g., when refueling). In some implementations, the compression ratio during gas compression can be similar to the compression ratio of the engine during combustion. In some implementations, the refueling compression ratio may be, for example, between about 3.5 and 12. In some cases, the compression ratio is at least about 8. By maintaining this relatively high compression ratio and using multiple cylinders for compression, the rate of fuel that can be pumped through the engine is increased, thereby reducing filling times. The systems described below are also simple, requiring relatively few moving parts and minimal engine modification.

Moreover, by maximizing compression work (pressure increase and maximum flow rate), system energy efficiency is improved. For example, the energy expended on engine idling during refueling is minimized. The compressor valve systems described below also help to manage compression loads on the engine crankshaft during refueling. Referring to FIG. 1, a representative natural gas-powered automobile or vehicle 10 can comprise an engine compartment 12, a cabin portion 14, and a rear portion 16. As used herein, the terms "natural gas" and "gas" refer to a hydrocarbon gas, the primary component of which is methane gas having the chemical formula $CH_4$. The vehicle 10 can further include a natural gas compression system generally indicated at 18 configured to compress and store natural gas onboard the vehicle 10 for use as fuel. The natural gas compression system 18 includes a reciprocating internal combustion engine 20, a storage pressure tank 22 located in the rear portion 16 of the vehicle 10, a gas storage conduit 24 providing fluid communication between the engine 20 and storage tank 22, and a gas source conduit 26. The gas source conduit 26 has an inlet 21, and provides fluid communication between the engine and a gas source 23 at a pressure lower than that of the gas in the storage tank 22. The engine can be a spark-ignited or compression ignited internal combustion engine configured to operate using natural gas as fuel. In some embodiments, the engine can be specially designed to operate using natural gas as fuel, or can be retrofitted to operate using natural gas as fuel. The internal combustion engine 20 includes a cylinder head 28, as will be discussed in detail below.

Control logic for controlling the various components of the natural gas compression system 18 according to the methods described herein can be implemented by an onboard computer, such as an engine control unit or controller 50, using suitable software, e.g., as disclosed in U.S. patent application Ser. No. 14/244,807, incorporated by reference above. For ease of illustration, the controller 50 is shown separate from the engine 20. However, it should be understood that the controller 50 can be located at any suitable location on the vehicle, including in the engine 20.

In the embodiment shown, the natural gas compression system 18 can be in fluid communication with the natural gas source 23, such as a municipal gas utility hookup. In some embodiments, the natural gas source 23 can be coupled to the gas source conduit 26 of vehicle 10 by a gas supply nozzle. The natural gas compression system 18, which utilizes one or more bimodal cylinders of the engine 20, operated in a compressor mode, is configured to compress natural gas supplied by the natural gas source such that the gas flows into the storage pressure tank 22 up to a predetermined final pressure. In some implementations, the gas can be sequentially compressed further in each of several bimodal cylinders as will be described below. In this manner, the natural gas can be compressed in one or multiple compression stages all within the engine 20. During this process, other cylinders can be operated in combustion mode, thus providing power for compression.

Figure 2:
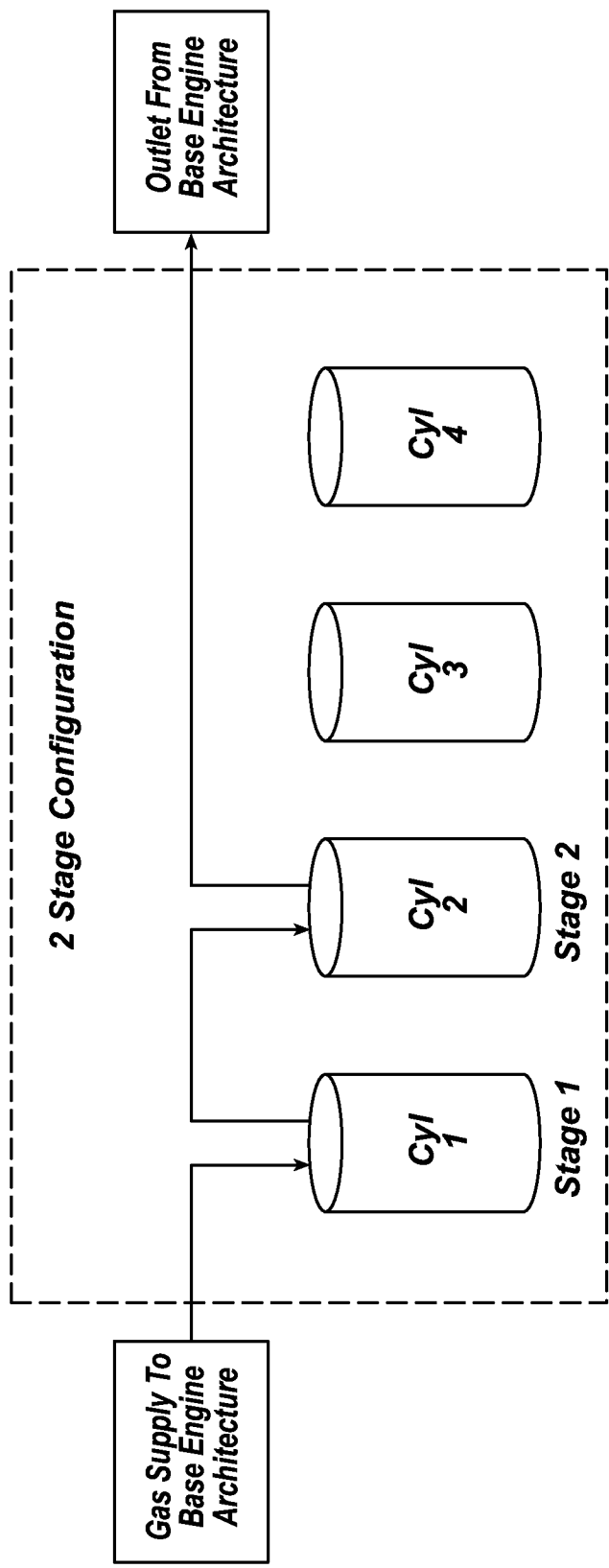
FIG. 2 is a schematic diagram illustrating a first configuration for in-cylinder onboard compression.

Referring to FIG. 2, in a first implementation during refueling, two of the bimodal cylinders of the engine, schematically illustrated as Cylinder 1 and Cylinder 2, are run in a compressor mode. The remaining cylinders of the engine (e.g., Cylinders 3 and 4) can be operated in a normal combustion mode to drive bimodal Cylinders 1 and 2. In the illustrated embodiment, Cylinders 1 and 2 operate 180 degrees out of phase with each other (i.e., when the piston of Cylinder 1 is in the TDC position, the piston of Cylinder 2 is in the BDC position), and can be configured to compress gas in two stages, illustrated schematically as Stage 1 and Stage 2. In the illustrated embodiment, Stage 1 compression occurs in Cylinder 1, where gas is compressed to a first pressure, and Stage 2 compression occurs in Cylinder 2, where gas is compressed to a second pressure. However, it should be understood that Stage 1 and Stage 2 compression can occur in any suitable bimodal cylinder, and that any suitable number of bimodal cylinders can be utilized in Stage 1 and/or Stage 2 compression. This pumping circuit lends itself well to engines with four or more cylinders. Because of the configuration of the compressor check valve system, discussed further below, the interstage pressure (between the outlet of Stage 1 and inlet of Stage 2) automatically adjusts so that the mass pumped by Cylinder 1 can equal the mass pumped by Stage 2, keeping the mass flow rate relatively constant over time.

In this implementation, gas travels to Cylinder 1 via an inlet to the cylinder head, is compressed in Cylinder 1, and is routed through a conduit internal to the head to Cylinder 2, in which the gas is further compressed. The compressed gas then is routed to the storage tank, as discussed above with reference to FIG. 1. Cooling may be provided at any point in the process. For example, cooling devices such as heat exchangers could be added, e.g., internal or external to the head after Stage 1 and/or in the line after Stage 2. In alternate embodiments external lines could be provided between Stage 1 and Stage 2 and/or after Stage 2. In this case, in some implementations air, engine coolant, cooling from the vehicle's air conditioning circuit, or the like can be provided to the lines.

The system shown in FIG. 2 can produce a final pressure of 500 psi or more, e.g., 500 to 800 psi, which may be used, for example, for adsorbent filling. Higher pressures may be obtained by adding additional stages (e.g., utilizing additional bimodal cylinders), inlet pressure boosting, or post-cylinder intensification, or combinations thereof. In the case of boosted inlet pressure, a compressor (e.g., compressor 302 of FIG. 1, which may be, for example, a belt driven compressor) may be interposed inline in between the inlet and engine. For post-cylinder intensification, a compressor may be interposed inline between the engine and storage tank (e.g., compressor 304, FIG. 1). Use of either or both of these techniques will reduce fill time, often without excessively increasing the energy required for refueling. Boosted inlet pressure will improve displacement and efficiency during Stage 1 compression, which will determine mass flow throughout the system. In some cases, with boosted inlet pressure fill times can be less than 20 minutes, e.g., 15 minutes or less. Upon completion of the gas compression process, the one or more bimodal cylinders can be switched back to the combustion mode, and the vehicle 10 can be operated using the compressed natural gas as fuel in all cylinders of the engine 20.

Figure 3A:
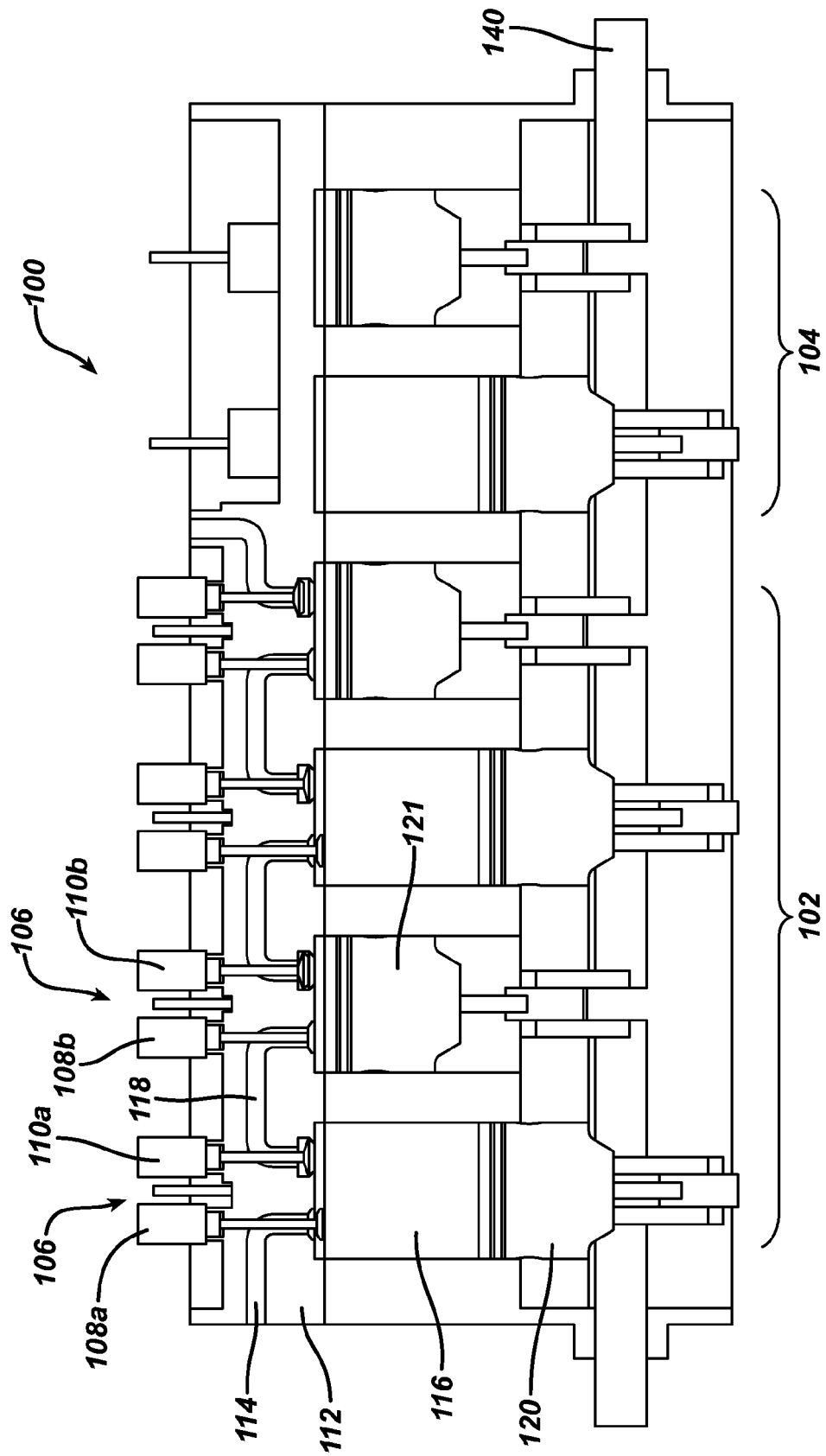
Figure 3C:
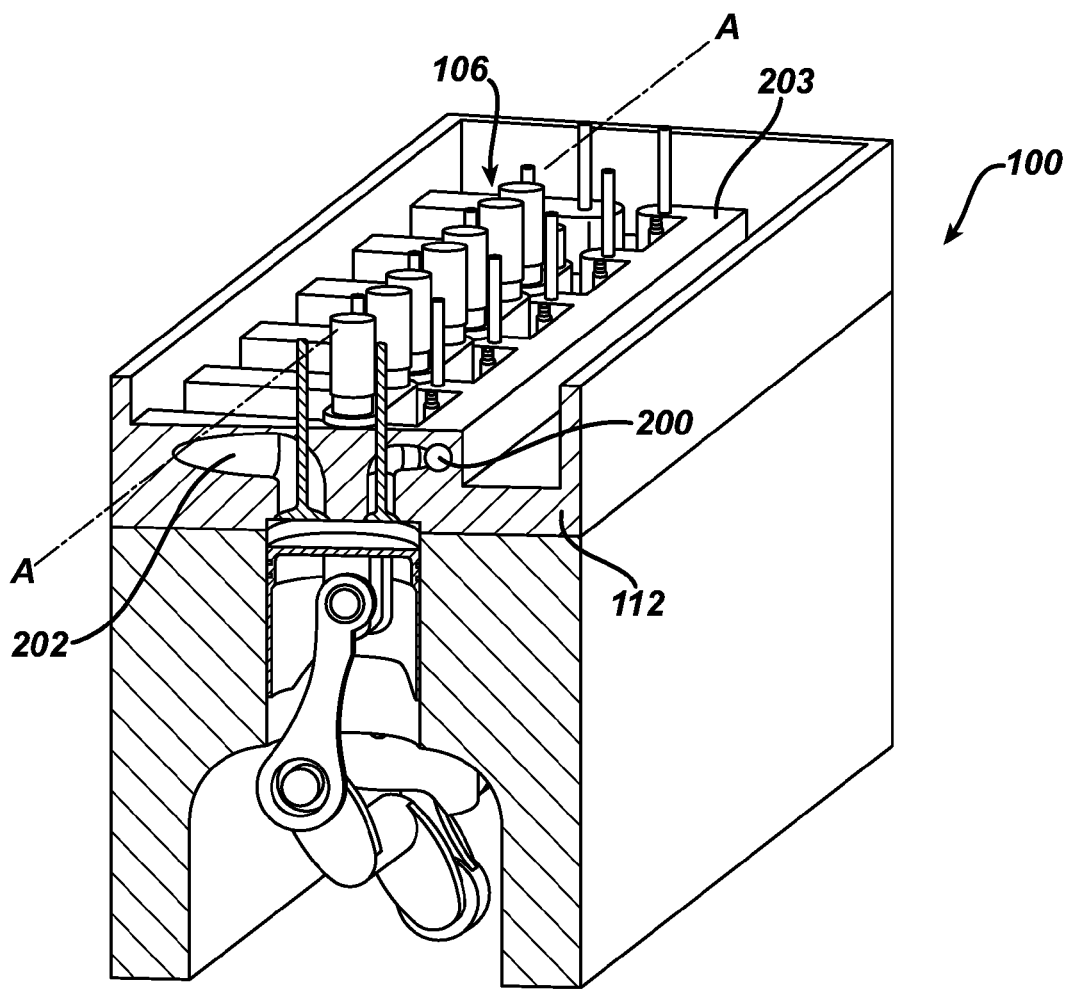
Figure 3D:
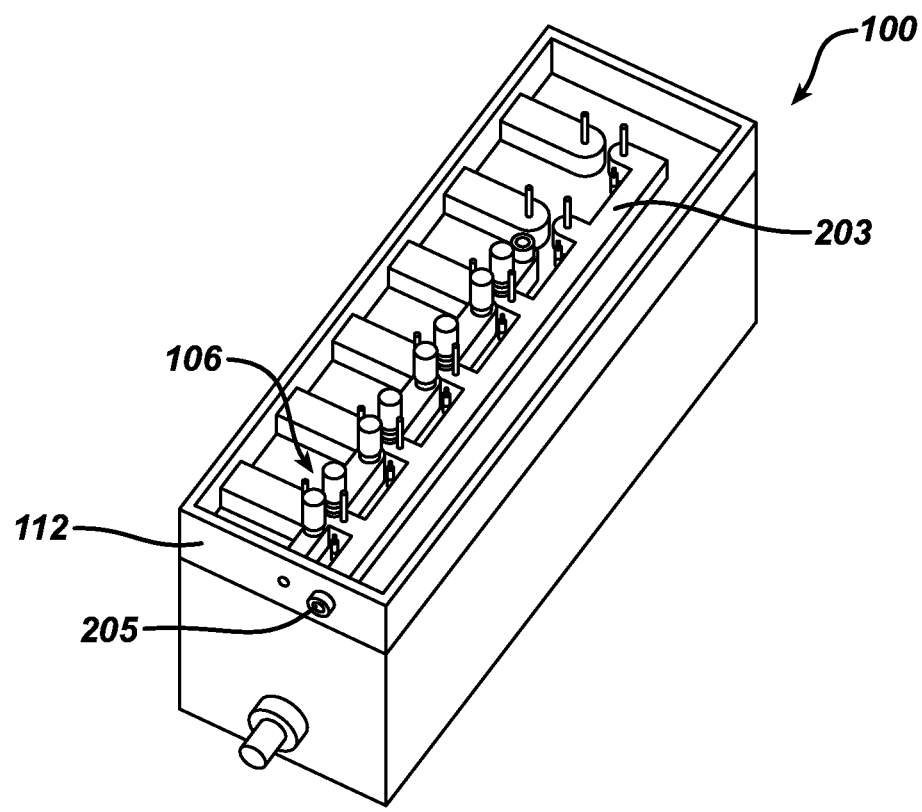
Figure 3E:
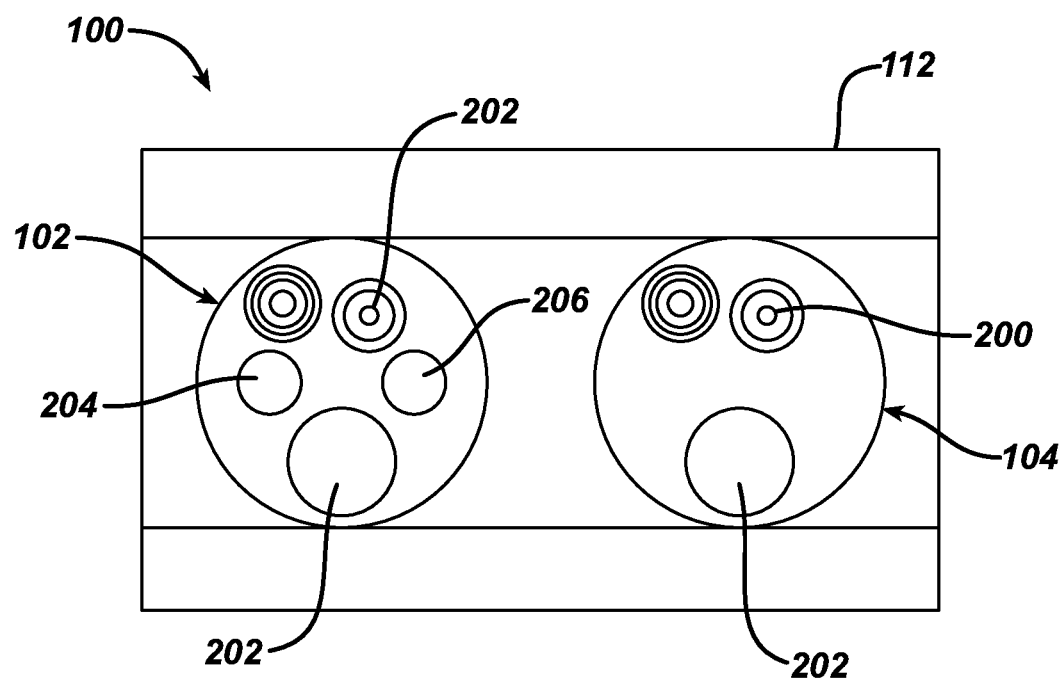

An engine assembly 100 that may be used in one implementation of the system shown diagrammatically in FIG. 2 is shown in detail in FIGS. 3A-3E. Using engine assembly 100, four cylinders may be used in series for multi-stage compression. Engine assembly 100 includes a plurality of bimodal cylinders 102 and a plurality of standard combustion cylinders 104 coupled to a common crankshaft 140 (see, e.g., FIGS. 3A and 3B). As shown in FIG. 3E, which shows a representative portion of the head 112 of engine assembly 100 from below, both the bimodal cylinders 102 and the standard cylinders 104 include an inlet channel 200 and an outlet channel 202, which are used in conventional fashion when the cylinder is in combustion mode. As seen in FIG. 3D, a fuel rail 203 provides fuel from a fuel inlet 205 to the intake channels 200 (FIG. 3E) as is well known.

The bimodal cylinders additionally include an inlet compression channel 204 and outlet compression channel 206, which are used when the cylinder is in compressor mode. Each of the bimodal cylinders 102 includes a compression check valve assembly 106 that includes an inlet check valve (e.g., inlet check valve 108a) and an outlet check valve (e.g., outlet check valve 110a), mounted within the respective inlet and outlet channels of head 112. The structures of the inlet and outlet check valves will be described in detail later with reference to FIGS. 7-7A.

As shown in FIGS. 3A-3B, in this implementation a conduit 114 supplies gas to the inlet of first cylinder chamber 116. As piston 120 moves downward in cylinder chamber 116, the inlet check valve 108a of the first bimodal cylinder passively opens inwardly in response to reduced pressure within the cylinder chamber, thereby allowing gas to flow into the chamber, while the outlet check valve 110a remains in its normally closed position. As the piston 120 rises (Stage 1 compression), compressing the gas, the outlet check valve 110a passively opens when a pressure is reached that is sufficient to overcome the combination of the spring bias and the force exerted on the top surface of the check valve. Because the surface area of the top surface of the check valve is greater than the surface area of the bottom surface, the pressure inside the cylinder must be greater than the pressure outside for the valve to open. The compressed gas flows past the outlet check valve and through conduit 118 to the inlet check valve of the second bimodal cylinder. The reduction in pressure caused by downward movement of piston 121, causes the inlet check valve 108b to passively open, allowing the gas to enter the second cylinder chamber 122 (FIG. 3B). At this point, the piston 121 in the second cylinder is in BDC position (FIG. 3B) and the inlet check valve 108b of the second bimodal cylinder is in its open position, allowing gas to flow into chamber 122. As in the previous stage, the outlet check valve 110b of the second bimodal cylinder is initially in its biased-closed position. During Stage 2 compression, the outlet check valve 110b is forced upwards and, thus, opened by the increasing pressure in cylinder chamber 122, allowing gas to flow to the next bimodal cylinder. This sequence is repeated for the remaining two cylinders, after which the gas, compressed to its final pressure, is routed to the storage tank via a high pressure gas line 24 (FIG. 1.)

As shown in FIGS. 3A and 3B, the inlet check valve opens with a downward motion, while the outlet check valve is an upward-opening poppet valve. Both valves are biased to a normally closed position. The operation of these valves, in the manner described in the preceding paragraph, provides a substantially constant, regulated mass flow rate. The valves generally will not open until the correct pressure differential has been reached and, thus, the timing of opening and closing of the valves will self-adjust as the pressure in the storage tank (and thereby the backpressure experienced through the cylinders) increases.

Figure 4:
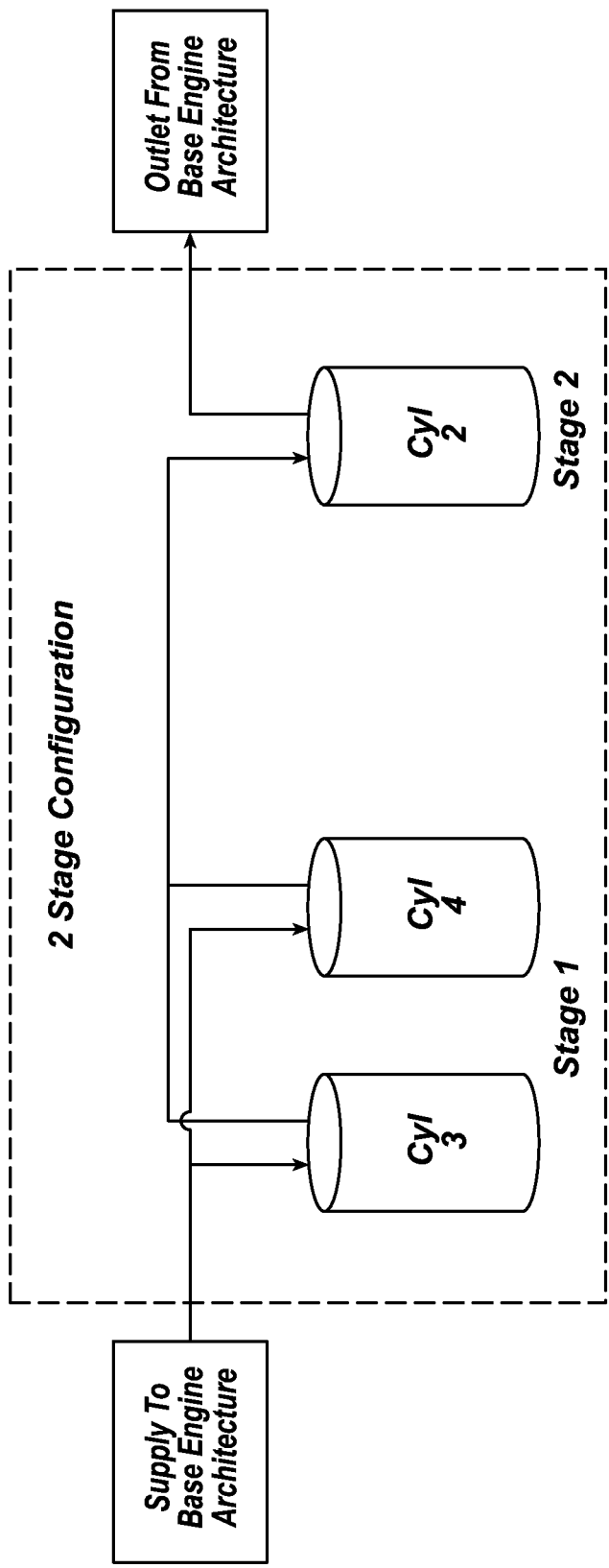
FIG. 4 is a schematic diagram illustrating a second configuration for in-cylinder onboard compression.

A second implementation is shown in FIG. 4. This configuration lends itself well to engines having 6 or more cylinders. In this implementation, Stage 1 compression occurs simultaneously in two (or in some cases more) bimodal cylinders. Thus, in this case, the two Stage 1 pistons are operated in phase with each other (for an inline cylinder engine—the pistons would be out of phase by 90 degrees for a V-cylinder engine), and the inlet check valves and outlet check valves of the two Stage 1 bimodal cylinders are operated together (both inlet valves are open when both outlet valves are closed and vice versa.) After compression to a first pressure, the compressed gas from all of the Stage 1 cylinders (Cylinders 3 and 4 in FIG. 4) flows to one or more Stage 2 cylinders (Cylinder 2 in FIG. 4) for compression to a second pressure.

This configuration results in compression of a larger volume of gas at once, thereby reducing refueling time, as well as allowing for more efficient compression, which can minimize the energy required for refueling. In some implementations 10 gallon gasoline equivalent (GGE) fill times can be less than 45 minutes, e.g., less than 30 minutes, or even less than 20 minutes.

The implementation shown in FIG. 4 can be used, for example, with a V8 engine (see, e.g., V8 engine 130 of FIG. 5) in which the Stage 1 cylinders are operated 90 degrees out of phase with the Stage 2 cylinders. It is also suitable for use in other types of engines, e.g., in an inline 6 cylinder engine, in which case the Stage 1 cylinders would be operated 120 degrees out of phase with the Stage 2 cylinders.

Figure 5:
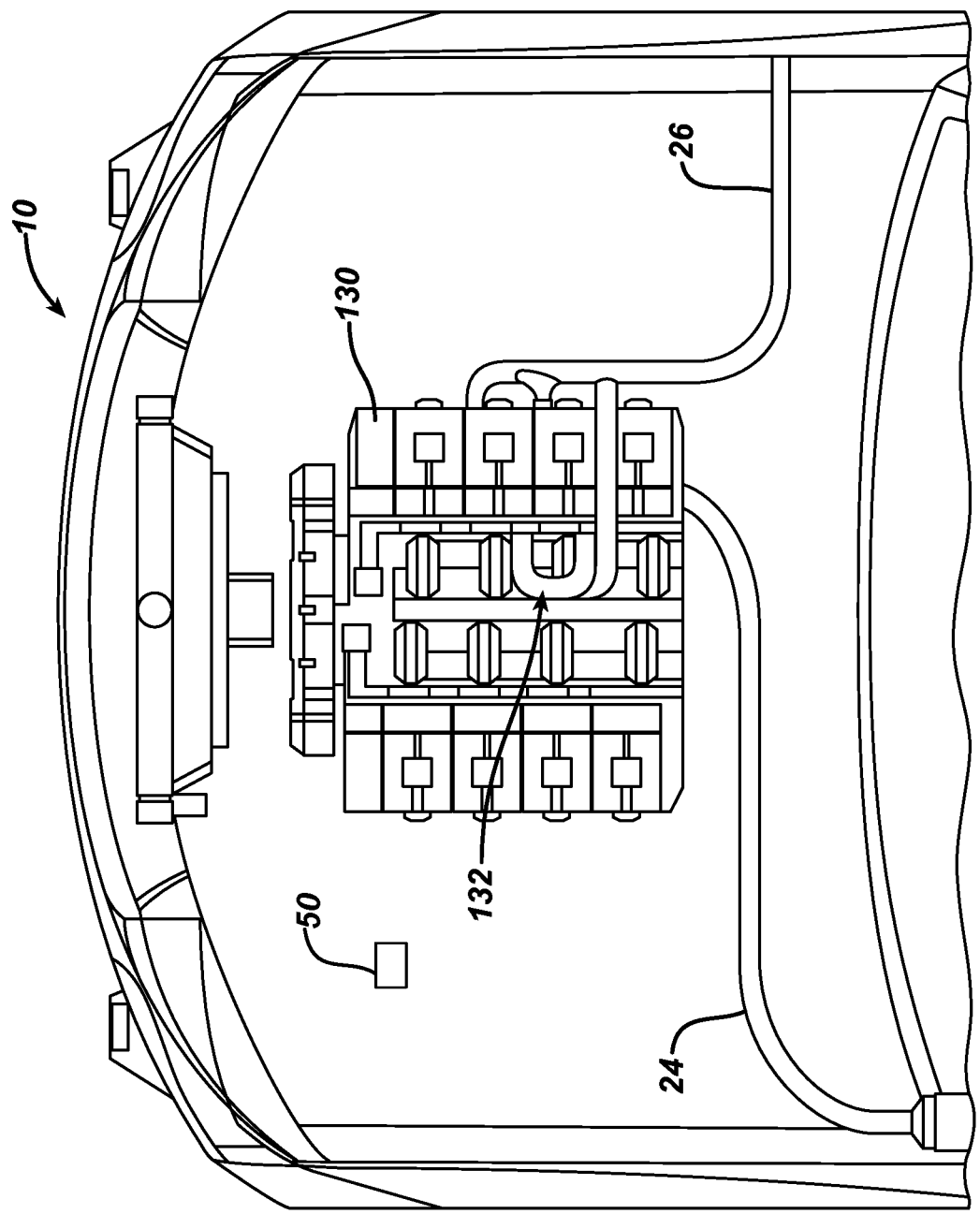
FIG. 5 is a diagrammatic plan view of the engine compartment of a vehicle utilizing the system illustrated in FIG. 4.

Gas can be supplied to the two Stage 1 cylinders using an external gas line system, such as gas line 132 shown in FIG. 5, or using internal conduits disposed within the head 112.

Figure 6:
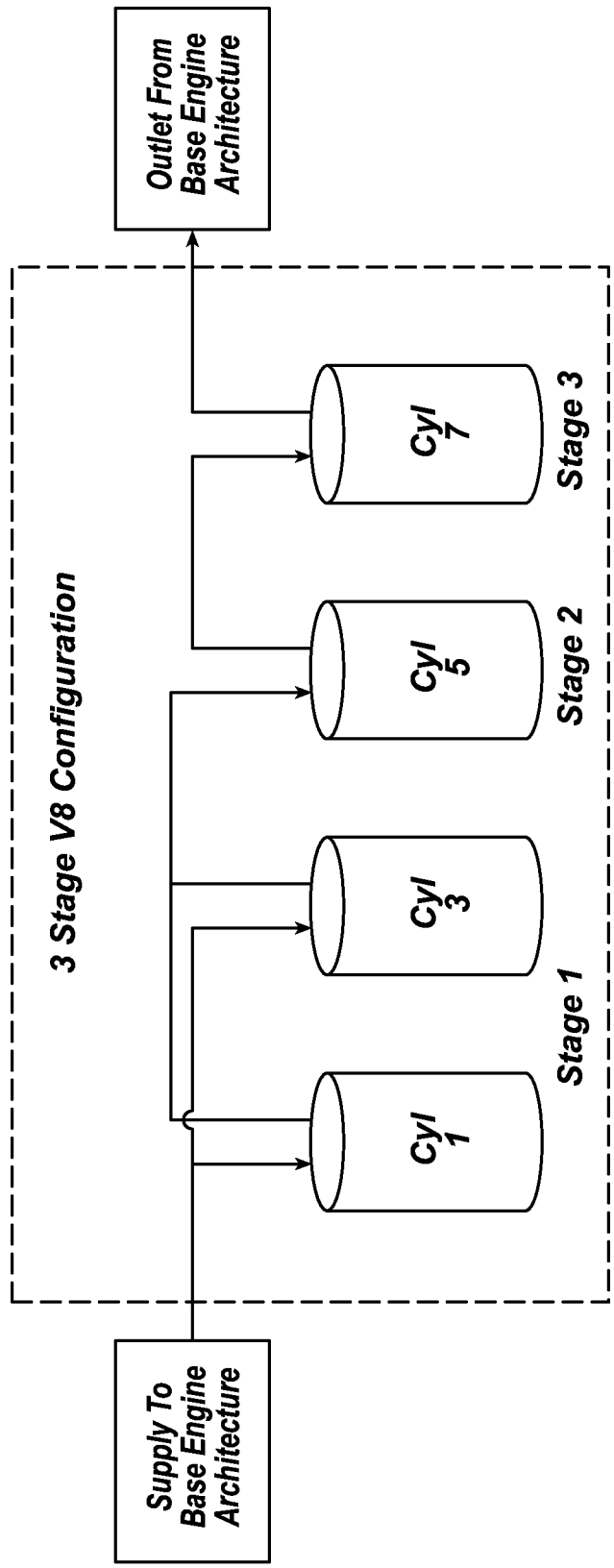
FIG. 6 is a schematic diagram illustrating a second configuration for in-cylinder onboard compression.

Another implementation is shown in FIG. 6. The configuration shown in FIG. 6 is similar to that shown in FIG. 4 and described above, except that an additional compression stage, Stage 3, is added, wherein gas is compressed to a third pressure. In this configuration, when used in a V8 engine, the Stage 1 cylinders (e.g., Cylinders 1 and 3) are 90 degrees out of phase with the Stage 2 cylinder (e.g., Cylinder 5), which, in turn, is 90 degrees out of phase with the Stage 3 cylinder (e.g., Cylinder 7). Any of the first, second, or third pressures recited herein can be the same, or different, as desired.

Figure 7:
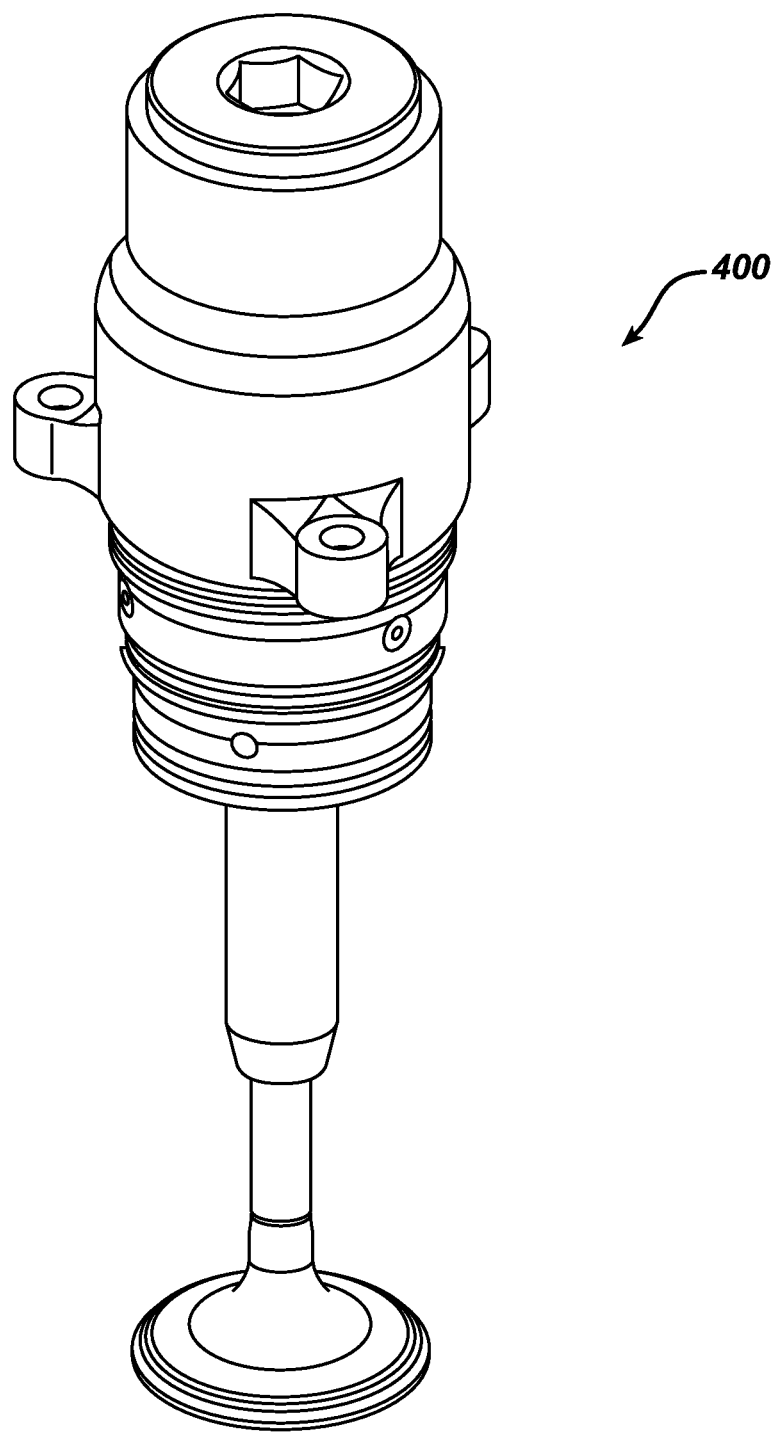
FIG. 7 is a perspective view of an inlet check valve according to one implementation.
Figure 7A:
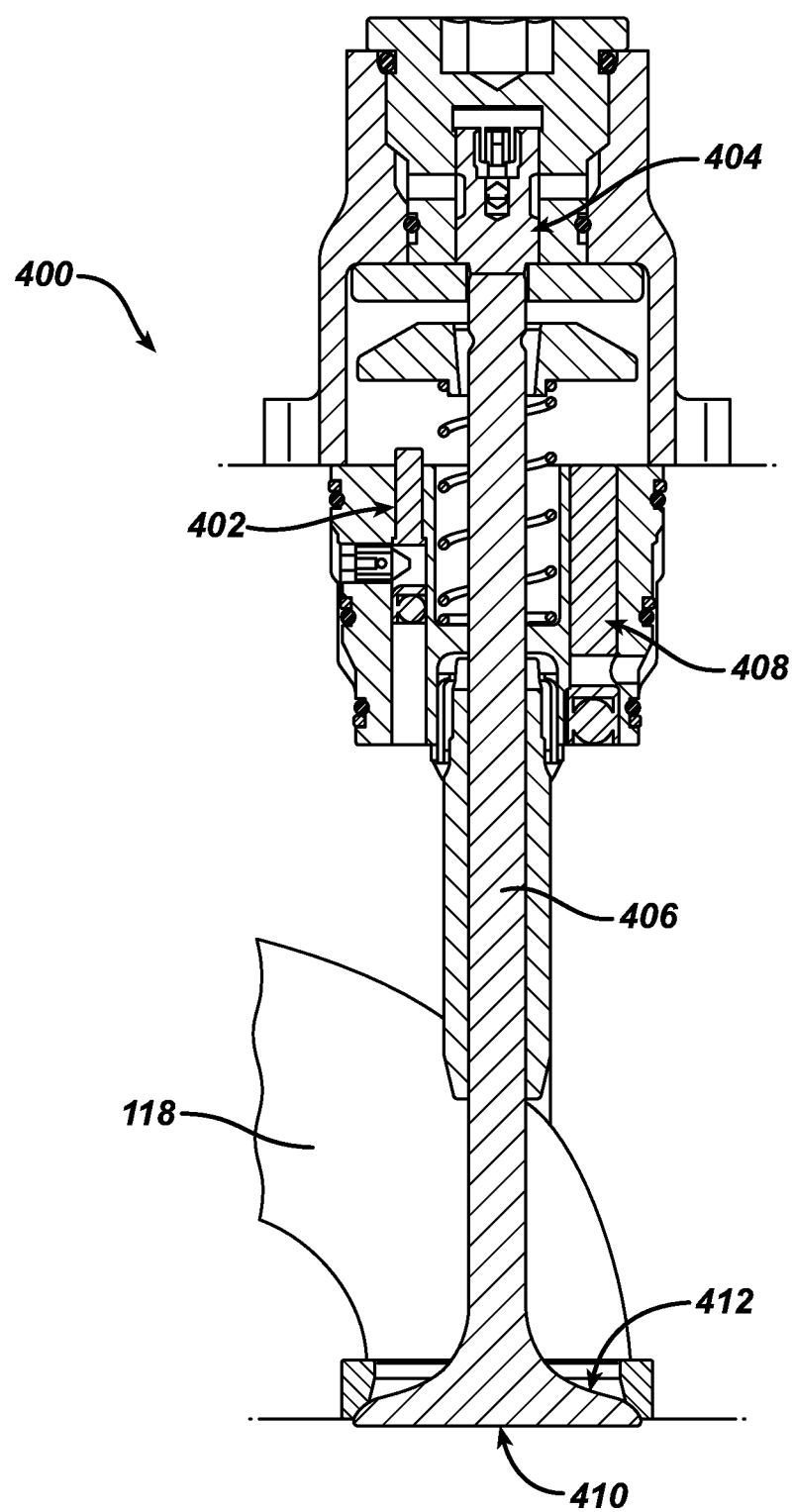
FIG. 7A is a cross-sectional view of the valve in a closed position.

Many types of check valves may be utilized as the inlet check valve. An example of a suitable check valve 400 is shown in FIGS. 7-7A. As discussed above, the inlet check valve is configured to be biased towards a normally closed position, and to open downwardly (e.g., into the cylinder) in response to reduced cylinder pressure. In order for the inlet check valve to function in the manner discussed above, the valve 400 is generally shaped such that its cylinder facing surface 410 has a larger area than the upper, head facing surface 412. This causes the valve to remain closed until the pressure on the inside of the cylinder is less than the pressure outside the cylinder (e.g., in the passage or conduit 118). Preferred check valves also include elements that control seating velocity on closing and on maximum opening, to preserve the life of the valve. Referring to FIG. 7A, the check valve 400 further includes a plurality of small diameter pins 402, spaced equally around the circumference of the valve, that are used as snubbers to dissipate velocity on maximum opening of the valve. These pins can be dimensioned to slow the last 1% to 20% of the valve stroke. The valve also includes one larger diameter pin 404 located at the proximal end of the valve stem 406, which is used as a snubber to control seating velocity on closing. The pin 404 acts directly on the valve stem 406, and can be dimensioned to slow the last 1% to 20% of the valve stroke. A plurality of large diameter pins 408 are positioned at equal spacing around the valve to lock the valve in a closed position.

Many types of upwardly (e.g., outwardly away from the cylinder chamber, as used in the systems disclosed herein) opening poppet valves may be used as the outlet check valves. Suitable outlet check valves include, for example, those described in U.S. Pat. No. 8,151,747. In order for the check valve to function in the manner discussed above, the valve is generally shaped such that its cylinder facing surface is smaller than the opposing head facing surface area. Preferably, the outlet check valve includes a high force locking mechanism to prevent unintended opening during compression and combustion.

Both the inlet check valve and outlet check valves are configured to be locked or maintained in their closed position when a bimodal cylinder is operated in the combustion mode. The check valve system may be placed in the locked out condition using a control device selected from, for example microprocessors, internal mechanics, hydraulic controllers, pneumatic controllers, and mechanical controllers, or any combinations thereof. In some implementations, an external three way solenoid valve may be used to switch the check valve system between refueling and compression modes.

Internal combustion engines may be designed and made specifically to compress gas according to the methods described herein. Alternatively, existing internal combustion engines may be modified to perform the gas compression methods described herein. Such engines may be incorporated into new vehicles, or into existing vehicles. As used herein, "incorporating" an engine into a vehicle means placing an engine into a new vehicle, placing an engine into an existing vehicle, or modifying the engine of an existing vehicle to perform the gas compression methods described herein.

In a representative embodiment, a method can include making an internal combustion engine having a plurality of bimodal cylinders operable in a compression mode or a combustion mode, the internal combustion engine further including a cylinder head having a valve system to regulate a flow of gas into and out of the bimodal cylinders when compressing gas in at least one of the bimodal cylinders, wherein at least a first bimodal cylinder and a second bimodal cylinder of the plurality of bimodal cylinders are in fluid communication with one another.

Operation of the natural gas compression system can proceed in the following manner. If all of the piston-cylinder assemblies of the engine are operating in the combustion mode, the engine can first be turned off. A user can then connect a natural gas source (e.g., source 23) to a natural gas input on the vehicle such that gas flows from the natural gas source to the gas source conduit of the engine block at the pressure of the natural gas source. The user can then engage the natural gas compression system 18 by, for example, actuating a controller activating a switch or other mechanism in the cab of the vehicle. The computer can then prepare the bimodal cylinders to operate in the compressor mode. The engine can then be restarted with the bimodal cylinders operating in the compressor mode as discussed and compressed gas being delivered to the storage tank in the vehicle. The final pressure of the compressed gas can be, for example, about 250 bar (3600 psi), corresponding to the standard pressure for storage of compressed natural gas in the United States.

In another embodiment, a user can operate a vehicle including an internal combustion engine configured to perform any of the gas compression methods described herein. The vehicle can be operated by actuating a controller to place a first bimodal cylinder in a compression mode and to compress gas within the first bimodal cylinder using the first bimodal cylinder as a reciprocating compressor. Operating the vehicle can further include activating one or more check valves of the first bimodal cylinder so that the one or more check valves can be opened or closed by changing pressure in the first bimodal cylinder. Operating the vehicle can further include operating at least one standard cylinder of the internal combustion engine in a combustion mode to drive the first bimodal cylinder in the compression mode. Operating the vehicle can further include fueling the vehicle with gas from a gas source, wherein the gas is compressed by the first bimodal cylinder. Operating the vehicle can further include actuating an onboard booster compressor to boost a pressure of gas received from the gas source before the gas is compressed by the first bimodal cylinder. Operating the vehicle can further comprise ceasing operation of the first bimodal cylinder in the compression mode when a pressure in a storage tank onboard the vehicle that receives gas compressed by the first bimodal cylinder reaches a predetermined pressure. Operating the vehicle can further comprise operating the first bimodal cylinder in the combustion mode using compressed gas from the storage tank as fuel.

In another representative embodiment, operating a vehicle including an internal combustion engine configured to perform any of the gas compression methods described herein can include transmitting control signals to place a first bimodal cylinder in the compression mode and to compress gas within the first bimodal cylinder. Operating the vehicle can also include transmitting control signals to activate one or more check valves so that the one or more check valves can be opened or closed by changing pressure in the first bimodal cylinder. Operating the vehicle can also include transmitting control signals to operate at least one standard cylinder in the combustion mode to drive the first bimodal cylinder in the compression mode. Operating the vehicle can also include fueling the vehicle with gas from a gas source, wherein the gas is compressed by the first bimodal cylinder. Operating the vehicle can also include transmitting control signals to an onboard booster compressor to boost the pressure of gas received from the gas source before the gas is compressed by the first bimodal cylinder. Operating the vehicle can also include transmitting control signals to cease operation of the first bimodal cylinder in the compression mode when the pressure in the storage tank reaches a predetermined pressure. Operating the vehicle can also include transmitting control signals to operate the first bimodal cylinder in the combustion mode using compressed gas from the storage tank as fuel.

Other Embodiments

Other embodiments are within the scope of the present disclosure.

For example, while natural gas is discussed above, in alternative embodiments the systems and methods disclosed herein can also be compatible with various other hydrocarbon gases including propane and butane, or non-hydrocarbon gases or gas mixtures, such as oxygen or air, to name a few.

While several multi-cylinder compression implementations are shown above, the methods described herein can be implemented in many different combinations of cylinders used for one or more compression stages.

In addition, the compressor check valves in the in-cylinder embodiments described above need not be in the head, but may instead be in a different location, e.g., a cylinder wall or within a piston assembly.

Moreover, the check valves discussed above can be replaced by other valve systems, e.g., by an electric or hydraulic fully flexible valve train or by valve systems utilizing other types or arrangements of mechanical or electro-mechanical check valves.

As will be clear from the various embodiments described above, the in-cylinder compression concepts described herein can be applied to a wide variety of internal combustion engine types, including inline four-cylinder engines, inline five-cylinder engines, inline six-cylinder engines, V-8 engines, V-10 engines, and V-12 engines, to name a few.

In some embodiments, the in-cylinder compression systems described above can feed a compressor and/or pressure amplifier, to compress the gas to a final pressure of 3600 psi or greater. The check valves described above can be used in other applications, for example in mainline natural gas integral compressor suction and discharge applications.

The ICE may be utilized outside of a vehicle, e.g., skid mounted or provided in a stationary location, for use as a dedicated compressor station. In such cases, the ICE may have been removed from a vehicle, or may have been purpose built for use as a compressor station.

Representative Computing Environment

Figure 8:
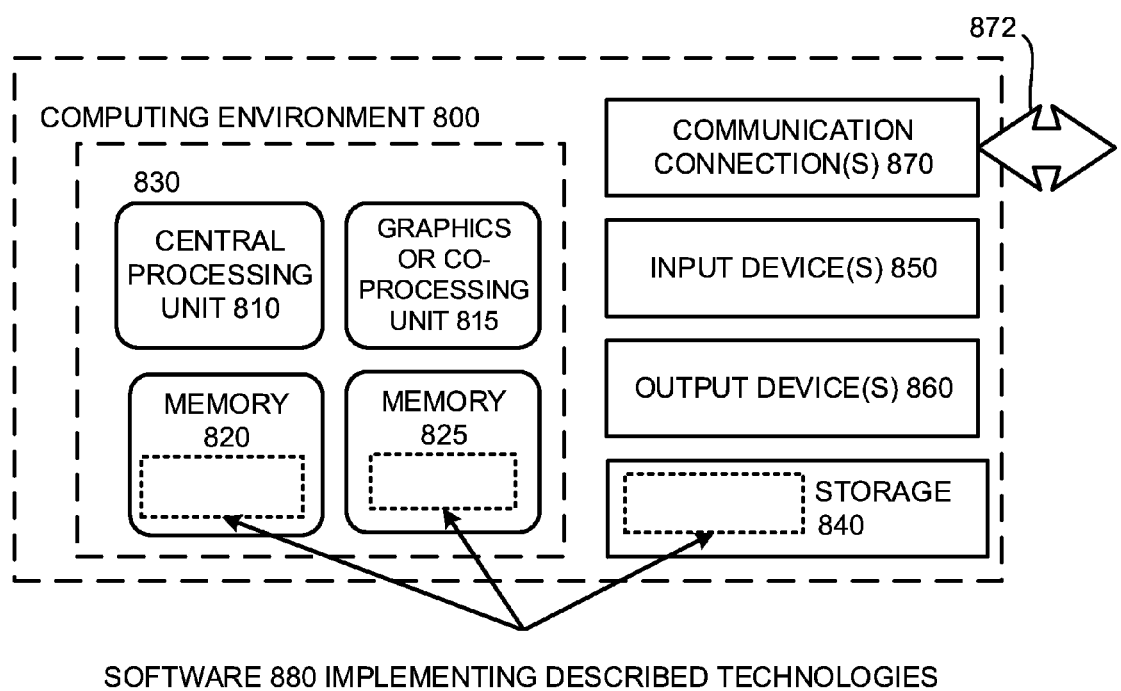
FIG. 8 is a schematic block diagram of a representative computing environment.

FIG. 8 depicts a generalized example of a suitable computing environment 800 in which software and control algorithms for the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., a controller such as an engine control unit, or any type of computing device such as a desktop computer, laptop computer, server computer, tablet computer, mobile device, programmable automation controller, etc.).

With reference to FIG. 8, the computing environment 800 includes one or more processing units 810, 815 and memory 820, 825 (e.g., for storing data of a wafer stage position and a counterforce corresponding to the position). In FIG. 8, this basic configuration 830 is included within a dashed line. The processing units 810, 815 execute computer-executable instructions. A processing unit can be a general-purpose central processing unit (CPU), a processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, in some embodiments, the computing environment 800 includes storage 840, one or more input devices 850, one or more output devices 860, and one or more communication connections 870. An interconnection mechanism (not shown) such as a bus, controller, or network, interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, CD-ROMs, DVDs, or any other medium that can be used to store information in a non-transitory way and can be accessed within the computing environment 800. The storage 840 stores instructions for the software 880 implementing one or more innovations described herein (e.g., for converting a bimodal cylinder between a compression mode and a combustion mode).

The input device(s) 850 may be, for example: a touch input device, such as a keyboard, mouse, pen, or trackball; a voice input device; a scanning device; any of various sensors; another device that provides input to the computing environment 800; or combinations thereof. For video encoding, the input device(s) 850 may be a camera, video card, TV tuner card, or similar device that accepts video input in analog or digital form, or a CD-ROM or CD-RW that reads video samples into the computing environment 800. The output device(s) 860 may be a display, printer, speaker, CD-writer, or another device that provides output from the computing environment 800.

The communication connection(s) 870 enable communication over a communication medium to another computing entity. The communication medium transmits and receives information 872, such as control signals or sensor data from sensors employed by any of the systems described herein. The communication medium can also convey computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any suitable control unit, such as an engine control unit, or any commercially available computer, including smart phones, other mobile devices that include computing hardware, or programmable automation controllers). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

In view of the many possible embodiments to which the principles of the disclosure may be applied, it should be recognized that the illustrated embodiments are only preferred examples and should not be taken as limiting the scope of the disclosure. Rather, the scope of the disclosure is defined by the following claims.

What is claimed is:

1. An internal combustion engine, comprising:
    a first bimodal cylinder operable in a first bimodal cylinder compression mode to compress fuel gas without combusting the fuel gas when fuel gas is received in the first bimodal cylinder from a fuel gas source, and operable in a first bimodal cylinder combustion mode to combust fuel gas;
    a second bimodal cylinder in fluid communication with the first bimodal cylinder and operable in a second bimodal cylinder compression mode and a second bimodal cylinder combustion mode;
    a fuel gas source conduit in fluid communication with the first bimodal cylinder and fluidly couplable to the fuel gas source to supply fuel gas to the first bimodal cylinder when the first bimodal cylinder is operating in the first bimodal cylinder compression mode; and
    a cylinder head including a valve system operable to regulate a flow of fuel gas into the first bimodal cylinder from the fuel gas source conduit and out of the first bimodal cylinder to the second bimodal cylinder when compressing fuel gas in the first bimodal cylinder.

2. The internal combustion engine of claim 1, further comprising at least one cylinder operable in a combustion mode to drive the first bimodal cylinder when compressing fuel gas in the first bimodal cylinder, the at least one cylinder and the first bimodal cylinder being coupled to a common crankshaft.

3. The internal combustion engine of claim 1, wherein the first and second bimodal cylinders are in fluid communication via a conduit defined in the cylinder head.

4. The internal combustion engine of claim 3, wherein the valve system comprises at least one check valve.

5. The internal combustion engine of claim 4, wherein the at least one check valve is associated with the first bimodal cylinder, the at least one check valve being actuated by changing pressure within the first bimodal cylinder when the first bimodal cylinder is operating in the first bimodal cylinder compression mode.

6. The internal combustion engine of claim 5, wherein the at least one check valve is lockable in a closed position when the first bimodal cylinder is operated in the first bimodal cylinder combustion mode.

7. The internal combustion engine of claim 1, wherein:
the first bimodal cylinder compresses fuel gas to a first pressure; and
the second bimodal cylinder receives fuel gas from the first bimodal cylinder and compresses the fuel gas to a second pressure greater than the first pressure.

8. The internal combustion engine of claim 7, wherein:
the first bimodal cylinder and a third bimodal cylinder both compress fuel gas to the first pressure; and
the second bimodal cylinder receives fuel gas from the first and third bimodal cylinders and compresses the fuel gas to the second pressure.

9. The internal combustion engine of claim 1, wherein the valve system further comprises an inlet valve configured to open inwardly into the first bimodal cylinder and an outlet valve configured to open outwardly away from the first bimodal cylinder.

10. The internal combustion engine of claim 1, wherein the cylinder head further comprises inlet and outlet channels operable during operation of the first bimodal cylinder in the first bimodal cylinder combustion mode.

11. The internal combustion engine of claim 1, further comprising a booster compressor in fluid communication with the fuel gas source and the first bimodal cylinder.

12. A vehicle including the internal combustion engine of claim 1.

13. A method, comprising making an internal combustion engine including a first bimodal cylinder operable in a first bimodal cylinder compression mode to compress fuel gas without combusting the fuel gas when fuel gas is received in the first bimodal cylinder from a fuel gas source and operable in a first bimodal cylinder combustion mode to combust fuel gas, the internal combustion engine further comprising a second bimodal cylinder in fluid communication with the first bimodal cylinder and operable in a second bimodal cylinder compression mode and a second bimodal cylinder combustion mode, the internal combustion engine further comprising a fuel gas source conduit in fluid communication with the first bimodal cylinder and fluidly couplable to the fuel gas source to supply fuel gas to the first bimodal cylinder when the first bimodal cylinder is operating in the first bimodal cylinder compression mode, the internal combustion engine further comprising a cylinder head including a valve system operable to regulate a flow of fuel gas into the first bimodal cylinder from the fuel gas source conduit and out of the first bimodal cylinder to the second bimodal cylinder when compressing fuel gas in the first bimodal cylinder.

14. The method of claim 13, wherein making the internal combustion engine further comprises making at least one cylinder operable in a combustion mode to drive the first and second bimodal cylinders when compressing fuel gas in the first and second bimodal cylinders.

15. The method of claim 13, wherein making the internal combustion engine further comprises making a conduit in the cylinder head to fluidly couple the first and second bimodal cylinders.

16. The method of claim 13, wherein making the internal combustion engine further comprises:
making the valve system operable with the first bimodal cylinder to compress fuel gas to a first pressure; and
making the valve system operable with the second bimodal cylinder to receive fuel gas from the first bimodal cylinder and compress the fuel gas to a second pressure.

17. The method of claim 13, further comprising incorporating the internal combustion engine into a vehicle.

18. A method, comprising operating a vehicle having an internal combustion engine including a first bimodal cylinder operable in a first bimodal cylinder compression mode to compress fuel gas without combusting the fuel gas when fuel gas is received in the first bimodal cylinder from a fuel gas source and operable in a first bimodal cylinder combustion mode to combust fuel gas, the internal combustion engine further comprising a second bimodal cylinder in fluid communication with the first bimodal cylinder and operable in a second bimodal cylinder compression mode and a second bimodal cylinder combustion mode, the internal combustion engine further comprising a fuel gas source conduit in fluid communication with the first bimodal cylinder and fluidly couplable to the fuel gas source to supply fuel gas to the first bimodal cylinder when the first bimodal cylinder is operating in the first bimodal cylinder compression mode, the internal combustion engine further comprising a cylinder head including a valve system operable to regulate a flow of fuel gas into the first bimodal cylinder from the fuel gas source conduit and out of the first bimodal cylinder to the second bimodal cylinder when compressing fuel gas in the first bimodal cylinder, the first and second bimodal cylinders being operable as reciprocating compressors to compress gas when operating in the first bimodal cylinder compression mode and the second bimodal cylinder compression mode, respectively.

19. The method of claim 18, wherein operating the vehicle further comprises actuating a controller to place the first bimodal cylinder in the first bimodal cylinder compression mode and the second bimodal cylinder in the second bimodal cylinder compression mode, and compressing fuel gas within the first and second bimodal cylinders using the first and second bimodal cylinders as reciprocating compressors, or transmitting control signals to place the first bimodal cylinder in the first bimodal cylinder compression mode and the second bimodal cylinder in the second bimodal cylinder compression mode, and transmitting control signals to compress fuel gas within the first and second bimodal cylinders using the first and second bimodal cylinders as reciprocating compressors.

20. The method of claim 19, wherein operating the vehicle further comprises activating one or more check valves of the valve system in fluid communication with the first bimodal cylinder so that the one or more check valves can be opened or closed by changing pressure in the first bimodal cylinder to receive fuel gas from the fuel gas source conduit into the first bimodal cylinder and to allow fuel gas compressed by the first bimodal cylinder to flow to the second bimodal cylinder, or transmitting control signals to activate the one or more check valves so that the one or more check valves can be opened or closed by changing pressure in the first bimodal cylinder.

21. The method of claim 18, wherein:
the internal combustion engine further comprises at least one cylinder operable in a combustion mode; and
operating the vehicle further comprises operating the at least one cylinder in the combustion mode to drive the first bimodal cylinder in the first bimodal cylinder compression mode and the second bimodal cylinder in the second bimodal cylinder compression mode, or transmitting control signals to operate the at least one cylinder in the combustion mode to drive the first bimodal cylinder in the first bimodal cylinder compression mode and the second bimodal cylinder in the second bimodal cylinder compression mode.

22. The method of claim 18, wherein operating the vehicle further comprises fueling the vehicle with fuel gas from the fuel gas source, the fuel gas being compressed by the first and second bimodal cylinders.

23. The method of claim 22, wherein operating the vehicle further comprises actuating an onboard booster compressor to boost a pressure of fuel gas received from the fuel gas source before the fuel gas is compressed by the first bimodal cylinder, or transmitting control signals to the onboard booster compressor to boost the pressure of fuel gas received from the fuel gas source before the fuel gas is compressed by the first bimodal cylinder.

24. The method of claim 18, wherein operating the vehicle further comprises ceasing operation of the first bimodal cylinder in the first bimodal cylinder compression mode and ceasing operation of the second bimodal cylinder in the second bimodal cylinder compression mode when a pressure in a storage tank onboard the vehicle that receives fuel gas compressed by the first and second bimodal cylinders reaches a predetermined pressure, or transmitting control signals to cease operation of the first bimodal cylinder in the first bimodal cylinder compression mode and cease operation of the second bimodal cylinder in the second bimodal cylinder compression mode when the pressure in the storage tank reaches the predetermined pressure.

25. The method of claim 24, wherein operating the vehicle further comprises operating the first bimodal cylinder in the first bimodal cylinder combustion mode and the second bimodal cylinder in the second bimodal cylinder combustion mode using compressed fuel gas from the storage tank as fuel, or transmitting control signals to operate the first bimodal cylinder in the first bimodal cylinder combustion mode and the second bimodal cylinder in the second bimodal cylinder combustion mode using compressed fuel gas from the storage tank as fuel.

26. One or more non-transitory, computer-readable storage media storing computer executable instructions for causing a computer to perform the method of claim 18.

27. A method, comprising:
receiving fuel gas from a fuel gas source in a first bimodal cylinder of an internal combustion engine, the first bimodal cylinder being operable in a first bimodal cylinder compression mode to compress fuel gas without combusting the fuel gas, and operable in a first bimodal cylinder combustion mode to combust fuel gas in the first bimodal cylinder as fuel;
compressing fuel gas received from the fuel gas source in the first bimodal cylinder to a first pressure;
supplying compressed fuel gas from the first bimodal cylinder to a second bimodal cylinder in fluid communication with the first bimodal cylinder, the second bimodal cylinder being operable in a second bimodal cylinder compression mode and a second bimodal cylinder combustion mode;
compressing compressed fuel gas received from the first bimodal cylinder in the second bimodal cylinder to a second pressure; and
supplying compressed fuel gas from the second bimodal cylinder to a fuel gas storage volume in fluid communication with the second bimodal cylinder.

28. The method of claim 27, further comprising operating one or more cylinders of the internal combustion engine in a combustion mode to drive the first and second bimodal cylinders when the first bimodal cylinder is operating in the first bimodal cylinder compression mode and the second bimodal cylinder is operating in the second bimodal cylinder compression mode.

29. The method of claim 27, further comprising activating one or more check valves in fluid communication with the first bimodal cylinder so that the one or more check valves can be opened and closed by changing pressure in the first bimodal cylinder to receive fuel gas from the fuel gas source into the first bimodal cylinder and to allow fuel gas compressed by the first bimodal cylinder to flow to the second bimodal cylinder.

30. The method of claim 27, further comprising:
switching the first bimodal cylinder from the first bimodal cylinder compression mode to the first bimodal cylinder combustion mode;
switching the second bimodal cylinder from the second bimodal cylinder compression mode to the second bimodal cylinder combustion mode; and
supplying fuel gas to the first and second bimodal cylinders from the fuel gas storage volume for combustion in the first and second bimodal cylinders as fuel.

* * * * *